(12) United States Patent
Kemp

(10) Patent No.: US 7,643,994 B2
(45) Date of Patent: Jan. 5, 2010

(54) METHOD FOR GENERATING AN AUDIO SIGNATURE BASED ON TIME DOMAIN FEATURES

(75) Inventor: Thomas Kemp, Esslingen (DE)

(73) Assignee: Sony Deutschland GmbH, Köln (DE)

( * ) Notice: Subject to any disclaimer, the term of this patent is extended or adjusted under 35 U.S.C. 154(b) by 509 days.

(21) Appl. No.: 11/293,072

(22) Filed: Dec. 2, 2005

(65) Prior Publication Data
US 2006/0120536 A1 Jun. 8, 2006

(30) Foreign Application Priority Data
Dec. 6, 2004 (EP) .............................. 04028882.1

(51) Int. Cl.
*G10L 15/06* (2006.01)
(52) U.S. Cl. .............................. 704/243; 704/E19.009; 713/176
(58) Field of Classification Search ................ 704/243, 704/E19.009; 713/176
See application file for complete search history.

(56) References Cited

U.S. PATENT DOCUMENTS

| | | | | |
|---|---|---|---|---|
| 5,748,783 | A * | 5/1998 | Rhoads | 382/232 |
| 6,507,814 | B1 * | 1/2003 | Gao | 704/220 |
| 6,748,360 | B2 * | 6/2004 | Pitman et al. | 704/270 |
| 6,917,912 | B2 * | 7/2005 | Chang et al. | 704/207 |
| 6,937,977 | B2 * | 8/2005 | Gerson | 704/201 |
| 7,082,394 | B2 * | 7/2006 | Burges et al. | 704/243 |
| 7,095,871 | B2 * | 8/2006 | Jones et al. | 382/100 |
| 7,328,153 | B2 * | 2/2008 | Wells et al. | 704/231 |
| 2002/0083060 | A1 * | 6/2002 | Wang et al. | 707/10 |
| 2002/0133499 | A1 * | 9/2002 | Ward et al. | 707/102 |
| 2003/0191764 | A1 * | 10/2003 | Richards | 707/100 |
| 2005/0038635 | A1 * | 2/2005 | Klefenz et al. | 702/189 |
| 2006/0020958 | A1 * | 1/2006 | Allamanche et al. | 725/19 |
| 2006/0075237 | A1 * | 4/2006 | Seo et al. | 713/176 |
| 2006/0120536 | A1 | 6/2006 | Kemp | |

OTHER PUBLICATIONS

Changsheng Xu , David Dagan Feng, Robust and efficient content-based digital audio watermarking, Multimedia Systems, v.8 n.5, p. 353-368, Dec. 2002.*

J.S. Seo, J.A. Haitsma, T. Kalker, Linear speed-change resilient audio fingerprinting, in: Proceedings of the IEEE Benelux Workshop on Model Based Processing and Coding of Audio (MPCA) 2002, Leuven, Belgium, Nov. 2002.*

P. Bassia and I. Pitas, "Robust audio watermarking in the time domain," in Proc. EUSIPCO Rodos, Greece, vol. 1, Sep. 1998, pp. 25-28.*

C. Yang. Macs: Music audio characteristic sequence indexing for similarity retrieval. Proceedings of the Workshop on Applications of Signal Processing to Audio and Acoustics, 2001.*

(Continued)

*Primary Examiner*—Talivaldis Ivars Smits
*Assistant Examiner*—Greg A Borsetti
(74) *Attorney, Agent, or Firm*—Oblon, Spivak, McClelland, Maier & Neustadt, L.L.P.

(57) ABSTRACT

A method for analyzing audio data (AD) is provided wherein a signature (SAD) is generated based on a feature set (FS) comprising a plurality of time domain related features (TDFk). The signature (SAD) is formed in order to represent a plurality of temporal positions or ranges of a plurality of characteristics of time domain related features (TDFk) within said audio data (AD).

26 Claims, 3 Drawing Sheets

OTHER PUBLICATIONS

Y. Shiu, C.-H. Yeh, C.-C. J. Kuo, Audio fingerprint extraction for content identification, in: Proceedings of SPIE Internet Multimedia Management Systems IV, vol. 5242, Nov. 2003, pp. 55-64.*

Dongge Li, Ishwar K. Sethi, Nevenka Dimitrova, Tom McGee, Classification of general audio data for content-based retrieval, Pattern Recognition Letters, v.22 n.5, p. 533-544, Apr. 2001.*

Ozer, H. and Sankur, B. and Memon, N., Robust audio hashing for audio identification, 12th European Signal Processing Conference (EUSIPCO), Sep. 2004.*

Tzanetakis, G. et al. "Pitch Histograms in Audio and Symbolic Music Information Retrieval", Proc. 3rd ISMIR 31-38, 2002.*

Ribbrock A et al: "A full-text retrieval approach to content-based audio identification" Proceedings of the 2003 IEEE Radar Conference. Huntsville, AL, May 5-8, 2003, IEEE Radar Conference, New York, NY: IEEE, US, Dec. 9, 2002, pp. 194-197, XP010642545.

Cano P et al: "A review of algorithms for audio fingerprinting" Proceedings of the 2003 IEEE Radar Conference. Huntsville, AL, May 5-8, 2003, IEEE Radar Conference, New York, NY: IEEE, US, Dec. 9, 2002, pp. 169-173, XP010642539.

Kurth F Ed—Institute of Electrical and Electronics Engineers: "A ranking technique for fast audio identification" Proceedings of the 2003 IEEE Radar Conference. Huntsville, AL, May 5-8, 2003, IEEE Radar Conference, New York, NY: IEEE, US, Dec. 9, 2002, pp. 186-189, XP010642543.

U.S. Appl. No. 12/255,221, filed Oct. 21, 2008, Eggink.

U.S. Appl. No. 12/369,352, filed Feb. 11, 2009, Kemp.

* cited by examiner

I : absolute time ordering :      SAD := <3, 5, 8, 16, 23>
II : absolute strength ordering : SAD := <5, 3, 16, 8, 23>
III : relative time ordering :    SAD := <2, 3, 8, 7>
IV : relative strength ordering : SAD := <-2, 13, -8, 15>

METHOD FOR GENERATING AN AUDIO SIGNATURE BASED ON TIME DOMAIN FEATURES

FIELD OF THE INVENTION

The present invention relates to a method for analyzing audio data.

The provision of characterizing data which may identify or characterize audio data for instance samples of speech or music, become more and more important as it is necessary for instance in customer devices to have means for robustly and reliably identify such audio data, for instance within a data base comprising a large plurality of music samples or the like. However, known identification schemes are connected with a high burden of computational work in order to clearly and reliably identify audible samples by providing characteristic properties of such audible samples.

BACKGROUND OF THE INVENTION

It is an aspect of the present invention to provide a method for analyzing audio data which is capable of reliably and robustly characterize and identify audio data at a comparably reduced computational burden.

SUMMARY OF THE INVENTION

The object underlying the present invention is achieved by a method for analyzing audio data. Preferred embodiments of the inventive method for analyzing audio data are within the scope of the dependent subclaims. The object underlying the present invention is also achieved by a method for classifying audio data, by an apparatus for analyzing audio data, by a computer program product, as well as by a computer readable storage means.

According to the present invention a method for analyzing audio data is provided which comprises (A) a step of providing audio data to be analyzed as input data, a step of analyzing said audio data with respect to a feature set of a plurality of features, (C) a step of generating a signature for said audio data which is at least one of descriptive, representative and characteristic for said audio data, and (D) a step of providing as an analysis result, said signature for said audio data as output data, wherein said feature set comprises a plurality of time domain related features, wherein said step of analyzing said audio data is carried out based on a plurality of time domain related features, and wherein said signature for said audio data is formed in order to at least one of contain, describe, and represent a plurality of temporal positions or temporal ranges of a plurality of characteristics of a plurality of time domain related features within said audio data.

It is therefore a key idea of the present invention to provide a method for analyzing audio data in which the process of generating a signature for said audio data is based on a feature set which contains a plurality of time domain related features and to base the process of analyzing on said plurality of time domain related features and further to built up said signature for said audio data in order to at least one of contain, describe, and represent a plurality of temporal positions or ranges of a plurality of characteristics of said time domain related features within said audio data. Therefore, said signature can be derived by avoiding Fourier transform processes or other transforming algorithms having a high computational burden. Therefore, the inventive method is fast, easy to design, and at the same time reliable and simple to apply.

It is of particular advantage if audio data of a finite length are used, in particular with a determined beginning and a determined ending.

According to a preferred embodiment of the inventive method for analyzing audio data additionally or alternatively absolute temporal positions of characteristics of time domain related features are involved in said step (C) of generating said signature for said audio data.

According to a further preferred embodiment of the inventive method for analyzing audio data additionally or alternatively relative temporal positions of characteristics of time domain related features are involved in said step (C) of generating said signature for said audio data.

It is of further advantage if additionally or alternatively in accordance to another embodiment of the inventive method for analyzing audio data characteristics of the same time domain related feature are involved in said step (C) of generating said signature for said audio data.

It may additionally or alternatively in accordance to another embodiment of the inventive method for analyzing audio data be preferred that characteristics of time domain related features of the same type are involved in said step (C) of generating said signature for said audio data.

In accordance to another embodiment of the inventive method for analyzing audio data characteristics of time domain related features of the different types may additionally or alternatively be involved in said step (C) of generating said signature for said audio data.

According to a still further preferred embodiment of the inventive method for analyzing audio data additionally or alternatively at least one of the strength, the time course of the strength and local extremer of the strength of time domain related features are used as characteristics.

Additionally or alternatively, time domain related features of the same type may be combined.

Time domain related features of different types may also be combined in addition or as an alternative.

For instance, an energy contour of the audio data is used as a time domain related feature.

Additionally or alternatively, a zero crossing rate of the audio data is used as a time domain related features.

Analogue-to-digital converted data are used as said audio data.

Down-sampled data may be used as said audio data in addition or as an alternative, in particular at a rate of 22050 Hz.

Additionally or alternatively, stereo-to-mono converted data are used as said audio data.

Preferably, data having a frame structure are used as said audio data.

In accordance to another embodiment of the inventive method for analyzing audio data said frame structure may be formed by a sequence of consecutive time frames, each time frame having a given and in particular fixed frame size and each time frame being separated from consecutive time frames by a given and in particular fixed frame shift.

Said frame shift may be chosen to be less than the frame size.

For instance, the frame size may be about 16 ms and the frame shift may be about 10 ms.

The temporal positions may be given as indices with respect to said time frames of the frame structure underlying the audio data.

In accordance to a still further embodiment of the inventive method for analyzing audio data said step (A) of providing said audio data may comprise at least one of receiving, reproducing, and generating said audio data.

The temporal positions in said signature may be given in their temporal order.

Alternatively or additionally, the temporal positions in said signature may be given in the order of the magnitude or strength of the respective characteristics or features.

According to a further aspect of the present invention, a method for classifying audio data is provided which comprises a step (S1) of providing audio data as input data, a step (S2) of generating a signature for said audio data, a step (S3) of providing a comparison signature, a step (S4) of comparing said signature for said audio data with said comparison signature and thereby generating comparison data, and a step (S5) of providing a classification result said comparison data as output data, wherein said signature for said audio data and in particular said comparison signature are obtained according to the inventive method for analyzing audio data.

According to a preferred embodiment of the inventive method for classifying audio data said step S3 of providing a comparison signature may comprise a step of providing additional audio data as additional input data and a step of generating an additional signature for said additional audio data. Said additional signature for said additional audio data may then be used as said comparison signature.

Additionally or alternatively, said additional signature for said additional audio data and thereby said comparison signature may be obtained according to the inventive method for analyzing audio data.

Further additionally or alternatively, at least two samples of audio data may be compared with respect to each other—one of said samples being assigned to said derived signature and the other one of said samples being assigned to said additional signature/comparison signature—in particular by comparing said signature and said additional signature/said comparison signature with respect to coinciding features and/or with respect to differing features.

Further additionally or alternatively, said at least two samples of audio data to be compared with respect to each other may be compared with respect to each other based of time domain related features first in a comparing pre-process and then based on additional features, e. g. based on features more complicated to calculate and/or based on frequency domain related features, in a more detailed comparing process.

In the sense of the present invention in all cases of all these methods and the like music, speech, noise and any combination thereof may be used as audio data or as pre-forms thereof.

According to a further aspect of the present invention, an apparatus for analyzing audio data is provided which is adapted and which comprises means for carrying out a method for analyzing audio data according to the present invention and the steps thereof.

According to a further aspect of the present invention a computer program product is provided comprising computer program means which is adapted to realize a method for analyzing audio data according to the present invention and the steps thereof, when it is executed on a computer or a digital signal processing means.

Additionally a computer readable storage medium is provided which comprises a computer program product according to the present invention.

These and further aspects of the present invention will be further discussed in the following:

The present invention in particular relates to a unique identifier for audio data and in more particular to a unique identifier for music.

With today's large capacity mp3 players and the corresponding flourishing music data exchange, there is a substantial problem with the identification of music. If two devices wish to communicate with each other about e. g. user preferences, or if a server based application should e. g. recommend music based on user play list histories, or if two databases should be merged, there is the need of a unique identifier for music. Such an identifier must be unique enough so that one piece of music is never confused with a different one, but must be robust enough so that different versions of the same music (different cut, amplification, compression) result in the same identifier. We propose a signal processing based tag which can be computed with very low effort on the music signal directly which satisfies the above constraints.

It is proposed to e. g. extract a variety of time domain features or time domain related features from a piece of music and to use the time stamps, i .e. where the time domain feature has occurred) as a signature describing this file. It is in particular proposed not to use the absolute location or temporal location or position but the relative distance of the time domain features as a part of the signatures. Furthermore, it is proposed to combine time domain features of several types, for example local maxima of the energy contour, local minima of the energy contour, maxima and minima of the zero crossing rate, into one signature, where the time differences between features within one type and also between types are all used to identify a given piece of music.

In order to speed up the searching process, we propose to use the song length as a restriction in the search. Only songs that have a similar length to the incoming song are considered for the comparison, which speeds up the search by a factor of 100 or more.

All the analysis may be carried out on frames. A frame is a time slice of the original music piece with a length of e. g. about 16 ms. Frames are spaced 10 ms apart from each other.

Specifically, it is proposed to use the following time domain features on suitably down sampled and stereo-to-mono converted audio files. A typical parameter for this is a sampling rate of about 22050 Hz.

The following properties may be used a features:

EPEAK is the difference of the mean value of the short-time energy as computed over a long time period (+− 50 frames) and the mean value of the short time energy as computed over a short time period (+− 2 frames).

EVALLEY is EPEAK multiplied by (−1).

ZCRPEAK is the difference of the mean value of the frame zero crossing rage as computed over a long time period (+− 50 frames) and the mean value of the frame zero crossing rate computed over a short time period (+− 2 frames).

ZCRVALLEY is ZCRPEAK multiplied by (−1).

The values of the above-mentioned time domain features (there are as many per feature as there are frames in the audio file) are sorted, and the highest N of them are retained (and sorted by value) to form the signature. N is dependent on the type of the feature. Typical choices could be N(EPEAK)=20, N(EVALLEY)=15, N(ZCRPEAK)=10, N(ZCRVALLEY)= 10.

The signature may be formed by the frame indices corresponding to the times or temporal locations of the peaks of the respective time domain features. The signature may therefore be formed as a n-tuple of respective index numbers or values.

When two signatures are compared to check whether they correspond to the same music, since they can be time shifted versions of each other, all possible differences between peaks in each of the time domain features have to be taken into account as potential shifts. Shifts exceeding a predefined threshold can be discarded, which greatly speeds up the comparison.

After all possible shifts have been extracted, the peaks of all individual time domain features are compared with each other. Identical time instances are counted as a hit. The strength of a hit is modified according to the relative position in the respective list, e. g. if the strongest peak in file 1 matches a strong peak in file 2, this will give a higher evidence of identity than if two weak peaks are matching. Peaks in different features are not compared to each other. As a result of this step, for each of the time domain features and every potential shift, a hit strength is obtained.

The hits from different features are then linearly combined with combination weights $W_i$, where i denotes the time domain feature used, to yield final similarity scores, conditioned on tentative shift. If any of the final similarity scores exceeds a predefined threshold, it is concluded that the two files are identical and are shifted with the corresponding shift relative to each other.

Since all proposed features are computed purely in the time domain, the entire processing is extremely fast and can be run on low powered hardware platforms.

With the proposed invention we can uniquely identify a piece of music in a music collection, independent from existing metadata like ID3 tags or the like. Wrong ID3 tags can even be corrected which otherwise renders impossible further processing. By computing the tag directly on the signal, there is complete independence of metadata, which is the main advantage of the proposed technology.

The proposed signature is fast to compute and particularly small. Also, it is symmetric, i. e. the effort to compare two identifiers or signatures is small on the server side and comparable with the effort to compute an identifier or signature.

BRIEF DESCRIPTION OF THE DRAWINGS

The invention will now be explained based on preferred embodiments thereof and by taking reference to the accompanying and schematical figures.

DETAILED DESCRIPTION OF THE INVENTION

In the following functional and structural similar or equivalent element structures will be denoted with the same reference symbols. Not in each case of their occurrence a detailed description will be repeated.

Figure 1:
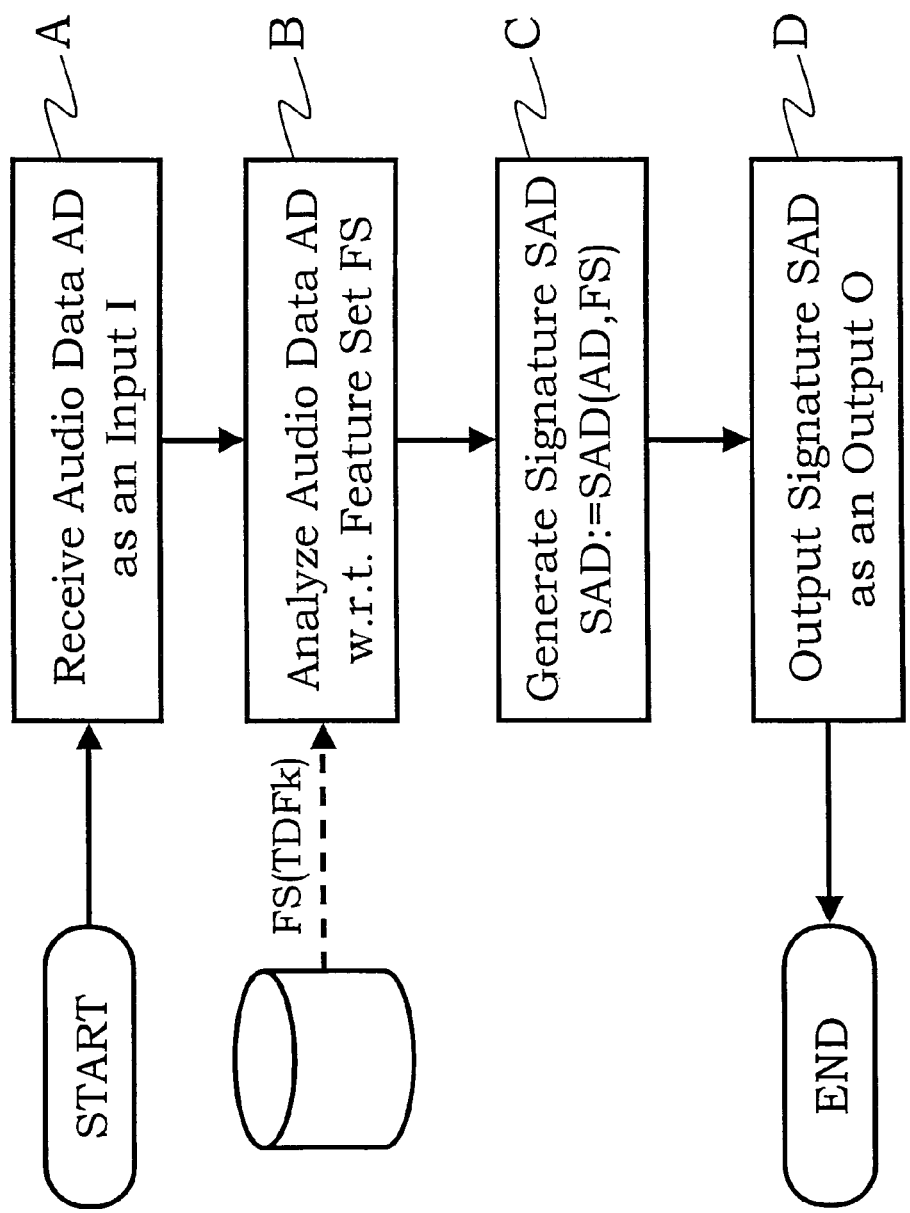
FIG. 1 is a schematical flow chart describing a preferred embodiment of the inventive method for analyzing audio data.

FIG. 1 is a schematical flow chart for elucidating an embodiment of the inventive method for analyzing audio data AD.

After a start-up procedure a sample of audio data AD is received as an input I. In the following step B said audio data AD are analyzed with respect to a feature set FS. Said feature set FS contains or is built up by a plurality of time domain features TDFk. Said feature set FS may be externally or internally be provided. In the following step C a signature SAD for said audio data AD with respect to the given feature set FS is generated.

In a final step D said signatures SAD for said audio data AD is provided and output as output data O.

Figures 2A, 2B:
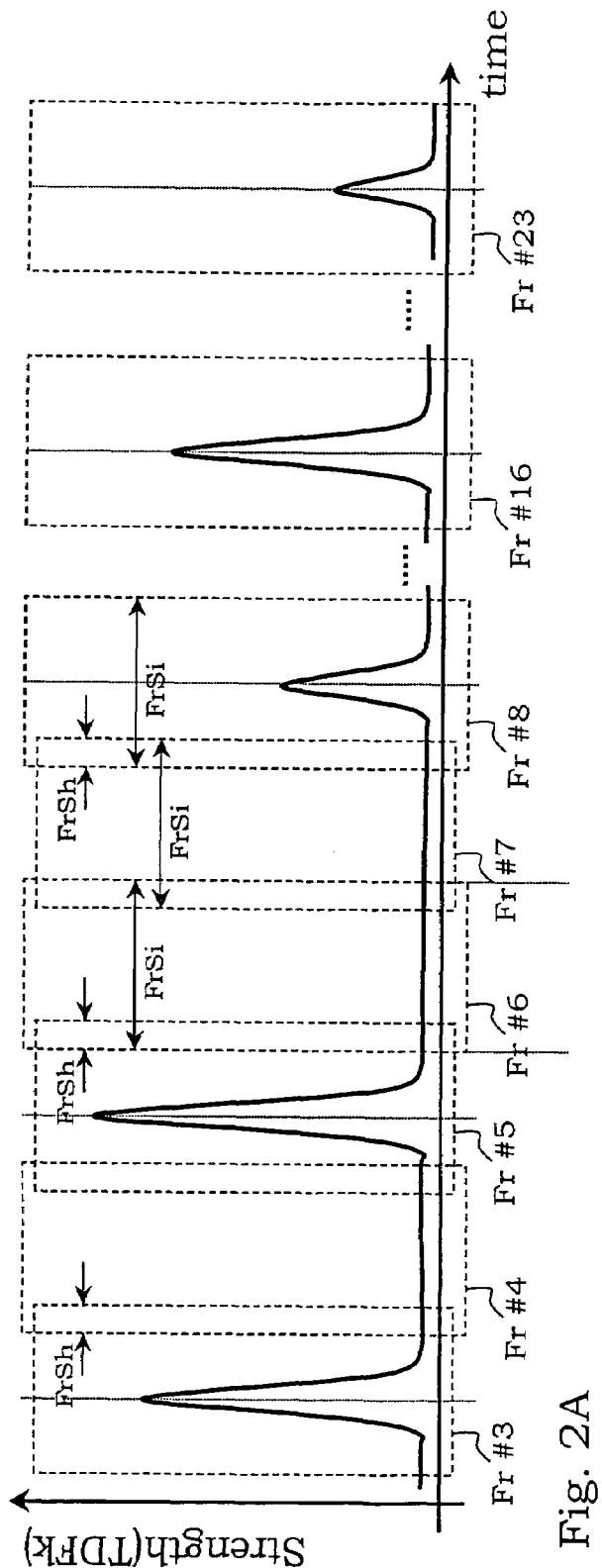
FIGS. 2A, 2B are schematical graphical representations which elucidate the process for obtaining the structure for a signature for audio data which can be obtained according to preferred embodiments of the inventive method for analyzing audio data.

FIGS. 2A and 2B schematically demonstrate different possibilities for obtaining a signature SAD for a given audible data sample AD.

The graph of FIG. 2A shows a distinct time domain feature TDFk and its strength or amplitude as a function of time t. Therefore in the graphical representation of FIG. 1 the abscissa is assigned to the time t and the ordinate is assigned to the amplitude or strength of the time domain feature TDFk.

The graphical representation of FIG. 2A also contains an indication of the respective frames, into which the time course is sub-divided. Each of the frames has a given number which is defined by the consecutive enumeration of the sequence of time frames. Each frame has a frame size FrSi and directly neighboured frames are shifted by a frame shift FrSh. Both parameters are defined as shown in the graphical representation of FIG. 2A.

As can be seen from the graphical representation of FIG. 2A there exist five local maxima with respect to the amplitude of the time domain feature TDFk. Each of said local maxima is localized within a given frame. In the order of their temporal occurrence the frames which contain the local extrema or local maxima are frames 3, 5, 8, 16, and 23.

Below the graphical representation examples for distinct signature SAD for the given audio data sample AD are demonstrated for different embodiments of the inventive method for analyzing audio data AD. In the first example, the signature SAD is just the 5-tupel given by the frame indices or frame numbers, i.e. SAD:=<3, 5, 8, 16, 23>. Therefore, this first example for a signature SAD uses the maxima for the time domain feature TDFk and shows the time ordered sequence of the respective frame indices starting at the very beginning of the audio data sample AD.

Sometimes, it is more convenient to compare not the time ordering but an ordering with respect to the magnitudes of the local maxima, i.e. by using an ordering for the frame indices which corresponds to the order of decreasing amplitudes for the maxima, i.e. the index for the most prominent maximum is mentioned first, followed by the frame index containing the next less prominent maximum and so on. Therefore, according to this particular embodiment respective signature SAD has the form SAD:=<5, 3, 16, 8, 23>.

It is also possible to use a strict relative time ordering, i.e. without taking into account the strength of the local maxima the enumeration and therefore the ordering of the maxima is started with the occurrence of the first maximum. Followed by the difference of index values between the first and the second following maximum, which is followed by the difference between the index of the first and the second maximum and so on. In this case the derived signature SAD has the form SAD:=<2, 3, 8, 7>.

Finally, it is also possible to use a relative time relationship together with taking into account an ordering with respect to the strength of the local maxima of the time domain feature TDFk. That means, that the ordering starts relatively to the temporal position of the most prominent local maximum, which is in the case of FIG. 1 the maximum of frame 5. Then the index difference to the next less prominent maximum situated in frame 3 is given, i.e. the value −2 is achieved. Then the difference in index values with respect to the next less prominent maximum situated in frame 16 is calculated, which yields the value 13. Accordingly, it follows that the next values for the signature are −8 and 15. SAD has the form: SAD :=<−2, 13, −8, 15>.

The results for the structure for SAD in the described cases are summarized in FIG. 2B.

Figure 3:
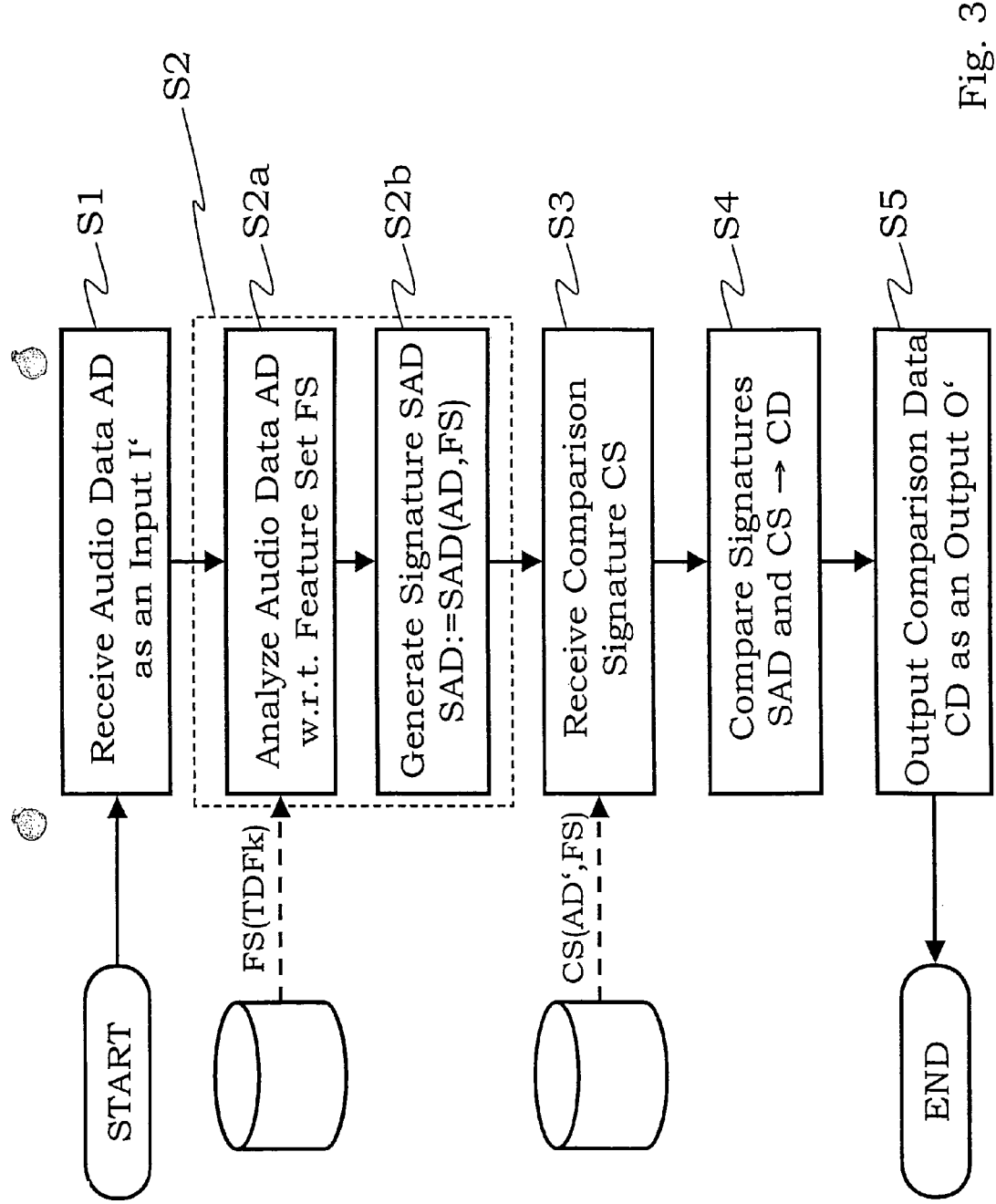
FIG. 3 is a schematical flow chart which elucidates a preferred embodiment of the inventive method for classifying audio data.

FIG. 3 is a schematical flow chart for an embodiment for a method for classifying audio data AD which can also be referred to as a method for comparing audio data or audio samples.

After a start-up or set-up procedure in a first step S1 an audio data sample AD to be classified is received as an input I'.

In a following step S2 said audio data sample AD is analyzed with respect to a received feature set FS in accordance to the inventive method for analyzing audio data AD by taking into account time domain features TDFk in a step S2a. In a further sub-step S2b the respective signature SAD for the received audio data sample AD is generated as a function of said audio data as well as a function of said feature set, i.e. SAD:=SAD(AD,FS).

In the following step a comparison signature SAD is obtained either as a fixed value or from a database or by generating said comparison signature from a further audio data sample AD' in the same manner as has been done with the received audio data sample AD.

In a further step S4 the signature SAD for the received audio data sample AD is compared with respect to the comparison signature CS. Thereby comparison data CD are generated which are representative and descriptive for the common features or differences between the signature SAD for the received audio data sample and the comparison signature CS.

Finally in a step S5 the comparison data CD as a function of said signature SAD for the received audio data sample AD and the comparison signature CS is provided as an output O'.

REFERENCE SYMBOLS

AD audio data, audio data sample
AD' audio data, audio data sample, additional audio data
CD comparison data
CS comparison signature
Fj Feature; j=1, . . . , n
Fr time frame within audio data
FrSh frame shift
FrSi frame size
FS feature set
I input, input data
I' input, input data
O output, output data
O' output, output data
SAD signature for received audio data AD
SAD' additional signature for received additional audio data AD'
TDFk time domain (related) feature; k=1, . . . , m

The invention claimed is:

1. An apparatus implementing a method of obtaining a signature for audio data, the method comprising:
   receiving at the apparatus audio data to be analyzed;
   determining at the apparatus a plurality of time domain features in said audio data;
   selecting at the apparatus a subset of said time domain features according to their position in the order of the magnitude or strength of the respective features; and
   generating at the apparatus a signature being descriptive, representative or characteristic for said audio data,
   wherein said signature is exclusively based on temporal positions of said subset of said time domain features.

2. The apparatus implementing the method according to claim 1, wherein audio data of a finite length are used, in particular with a determined beginning and a determined ending.

3. The apparatus implementing the method according to claim 2, wherein said temporal positions describe absolute temporal positions of said subset of said time domain features.

4. The apparatus implementing the method according to claim 1, wherein said temporal positions describe relative temporal shifts between two successive time domain features of said subset.

5. The apparatus implementing the method according to claim 1, wherein characteristics of the same time domain feature are involved when generating said signature for said audio data.

6. The apparatus implementing the method according to claim 1, wherein characteristics of time domain features of a same type are involved when generating said signature for said audio data.

7. The apparatus implementing the method according to claim 1, wherein characteristics of time domain features of different types are involved when generating said signature for said audio data.

8. The apparatus implementing the method according to claim 1, wherein at least one of a strength, a time course of a strength and local extremer of a strength of time domain features are used as characteristics of the time domain features.

9. The apparatus implementing the method according to claim 1, wherein time domain features of a same type are combined.

10. The apparatus implementing the method according to claim 1, wherein time domain features of different types are combined.

11. The apparatus implementing the method according to claim 1, wherein an energy contour of the audio data (AD) is used as a time domain feature.

12. The apparatus implementing the method according to claim 1, wherein a zero crossing rate of the audio data is used as a time domain feature.

13. The apparatus implementing the method according to claim 1, wherein analog-to-digital converted data are used as said audio data.

14. The apparatus implementing the method according to claim 1, wherein down-sampled data are used as said audio data.

15. The apparatus implementing the method according to claim 1, wherein stereo-to-mono converted data are used as said audio data.

16. The apparatus implementing the method according to claim 1, wherein data having a frame structure are used as said audio data.

17. The apparatus implementing the method according to claim 16, wherein said frame structure is formed by a sequence of consecutive time frames, each time frame having a predetermined frame size and each time frame being shifted with respect to a succeeding time frame by a predetermined frame shift.

18. The apparatus implementing the method according to claim 17, wherein the frame shift is chosen to be less than the frame size.

19. The apparatus implementing the method according to claim 17, wherein the frame size is substantially equal to 16 ms and the frame shift is substantially equal to 10 ms.

20. The apparatus implementing the method according to claim 17, wherein said time frames are indexed and said temporal positions are given based on said index.

21. The apparatus implementing the method according to claim 1, comprising receiving, reproducing, or generating said audio data.

22. The apparatus implementing the method according to claim 1, wherein temporal positions in said signature are given in their temporal order.

23. The apparatus implementing the method according to claim 1, wherein
- the time domain features of said subset of said time domain features are sorted in the order of the magnitude or strength of the respective features; and
- said signature is based on temporal positions of said sorted time domain features of said subset.

24. An apparatus implementing a method of analyzing audio data for obtaining a comparison result for the audio data, the method comprising:
- receiving at the apparatus first audio data to be analyzed;
- determining at the apparatus a plurality of time domain features in said first audio data;
- selecting at the apparatus a subset of said time domain features according to their position in the order of the magnitude or strength of the respective features; and
- generating at the apparatus a signature being descriptive, representative or characteristic for said first audio data, wherein said signature is exclusively based on temporal positions or temporal ranges of said subset of said time domain features;
- providing at the apparatus a comparison signature, said comparison signature being descriptive, representative or characteristic for second audio data; and
- determining at the apparatus a comparison result based on comparing said signature with said comparison signature.

25. The apparatus implementing the method according to claim 24, wherein at least two samples of audio data are compared to each other, one of said two samples being assigned to said signature and the other one of said samples being assigned to said comparison signature, wherein said comparing is based on determining coinciding features and/or differing features.

26. A computer readable storage medium including computer program instructions that cause a computer to execute a method for analyzing audio data, the method comprising:
- receiving audio data to be analyzed;
- determining a plurality of time domain features in said audio data;
- selecting a subset of said time domain features according to their position in the order of the magnitude or strength of the respective features; and
- generating a signature being descriptive, representative or characteristic for said audio data,
- wherein said signature is exclusively based on temporal positions of said subset of said time domain features.

* * * * *